US007890798B1

(12) United States Patent
Priddy

(10) Patent No.: US 7,890,798 B1
(45) Date of Patent: Feb. 15, 2011

(54) COMPUTER CLUSTER WITH SECOND-NODE INSTANCE OF APPLICATION HAVING ACCESS TO STATE SNAPSHOT OF FIRST-NODE INSTANCE OF APPLICATION

(75) Inventor: Kenneth Priddy, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1317 days.

(21) Appl. No.: 10/806,261

(22) Filed: Mar. 22, 2004

(51) Int. Cl.
*G06F 11/00* (2006.01)
(52) U.S. Cl. ....................................................... 714/11
(58) Field of Classification Search .................... 714/11
See application file for complete search history.

(56) References Cited

U.S. PATENT DOCUMENTS

| | | | |
|---|---|---|---|
| 5,978,565 A * | 11/1999 | Ohran et al. ................... 714/13 |
| 6,088,727 A * | 7/2000 | Hosokawa et al. ........... 709/223 |
| 6,134,673 A * | 10/2000 | Chrabaszcz .................. 714/13 |
| 6,266,781 B1 * | 7/2001 | Chung et al. .................... 714/4 |
| 6,467,050 B1 * | 10/2002 | Keung ........................... 714/27 |
| 6,609,213 B1 | 8/2003 | Nguyen et al. |
| 6,618,821 B1 | 9/2003 | Duncan et al. |
| 6,957,251 B2 * | 10/2005 | Wisner et al. ................ 709/220 |
| 6,986,076 B1 * | 1/2006 | Smith et al. ..................... 714/4 |
| 7,058,846 B1 * | 6/2006 | Kelkar et al. .................... 714/4 |
| 2003/0221074 A1 | 11/2003 | Satoyama et al. |
| 2004/0025079 A1 | 2/2004 | Srinivasan et al. |

\* cited by examiner

*Primary Examiner*—Robert Beausoliel
*Assistant Examiner*—Amine Riad

(57) ABSTRACT

A computer cluster includes a first computer for running a first instance of an application and a second computer for running a backup instance of the application. The first node provides for creating a snapshot in volatile RAM of a state associated with the application while it is running. Initially, the snapshot can be created in the form of pointers to RAM used by the application so that the snapshot overlaps application data, but sections of the snapshot can be moved in RAM when the application needs to modify a section of its memory. The snapshot can then be transferred to a shared disk. In the event of a failure of the first node, the backup instance can begin processing from the state represented by the snapshot rather than from initial conditions.

12 Claims, 2 Drawing Sheets

COMPUTER CLUSTER WITH SECOND-NODE INSTANCE OF APPLICATION HAVING ACCESS TO STATE SNAPSHOT OF FIRST-NODE INSTANCE OF APPLICATION

BACKGROUND OF THE INVENTION

The present invention relates to computers and, more particularly, to a high-availability computer clusters (i.e., networks of computers that collaborate to minimize interruptions due to component failures). A major objective of the invention is to reduce the downtime associated with migrating a RAM-intensive application from a failed computer to an adoptive computer in a high-availability cluster.

Modern society has been revolutionized by the increasing prevalence of computers. As computers have occupied increasingly central roles, their continued operation has become increasingly critical. For example, the cost of lengthy downtime for an on-line retailer during a peak shopping period can be unacceptable.

Fault-tolerant computer systems have been developed that can continue running without any loss of data despite certain failure scenarios. However, fault-tolerant systems can be quite expensive. High-availability computer clusters have been developed as a more affordable alternative to fault-tolerant system to minimize downtime for mission-critical applications. For example, in a two-computer cluster with an independent hard disk system, data generated by an application running on a first computer can be stored on the hard disk system so that it is accessible by both computers. If the first computer fails, a dormant copy of the application pre-installed on the second computer can be launched and have access to data on the hard disk system.

Unlike fault-tolerant systems, high-availability systems can suffer data loss, e.g., data stored in volatile random-access memory or in processor registers and not otherwise saved to disk is typically lost when the host computer fails. However, if the initial data is stored on the hard disk system, the second instance of the application can recalculate the lost data. For many applications the additional delay involved in recalculating lost data can be quite small and acceptable.

However, there are applications, such as supply-control-software (SCS), that run complex calculations in RAM for days. If a computer fails near the end of a calculation, days will be lost as a second instance of the program recalculates from initial conditions. Such programs often have a "save" function, so that the state of the program can be saved. However, due to the large amount of memory involved, e.g., eight gigabytes, the save can delay calculations considerably, e.g., an hour for each save operation. This extent of delay makes users reluctant to use the save function—and thus exposes them to major delays in the event of a computer failure. What is needed is a cluster system that reduces the amount of recalculation required upon a computer failure, without unduly delaying execution of the application.

SUMMARY OF THE INVENTION

The present invention provides for creating, in volatile (e.g., RAM) memory, a snapshot of the state of the first instance of an application running on a first computer of a computer. As the first instance is manipulating application data, the snapshot can be transferred to storage media (e.g., a hard-disk system) accessible by a second instance of the application installed on a second computer in the same cluster. By initializing to the state represented by the snapshot, the second instance of the application can avoid having to repeat computations that led to the snapshot state. Preferably, the first computer is a multiprocessor system so that a processor not used for executing the application can be used for the transfer.

In a conceptually simple realization of the invention, the application is "frozen" in a fixed state while the snapshot is created. In this case, a copy of the data in RAM is made and also stored in RAM. In addition, processor state information can be stored in RAM as part of the snapshot. Once the snapshot is created, the application can "unfreeze" and continue processing from the saved state. Since the state is saved to RAM instead of hard disk, the time the application must be frozen is much less than it would be if the state were saved directly to disk.

Memory mapping techniques can avoid the need to create a complete copy of a state in RAM, further minimizing the impact of the snapshot on application execution. Initially, the snapshot can be represented by pointers to the memory being used by the application. Only memory sections about to be modified by the application need be copied; thus, the snapshot can "overlap" application memory to the extent that it remains unmodified. In the meantime, unmodified sections can be saved to disk. If a section to be modified has already been saved to disk, it need not be copied. Thus, RAM copying can be limited to sections of memory used by the application that are modified before they have been saved to disk. This, in turn, can be minimized by saving to disk first unmodified sections of application memory, and then saving copied sections afterwards.

In the event a failure halts execution of the application on the first computer, a second instance of the application on a second computer can access the snapshot and begin processing from the state represented in the snapshot rather than from initial conditions. If sufficient resources are available, the second instance of the application program can begin from the snapshot while the first instance is running; that way, if the first instance fails, the second instance will have progressed beyond the snapshot state, further reducing the delay suffered in the event of a failure.

A major advantage of the invention is that upon a failure of a first instance of an application, a second instance can benefit from the processing accomplished by the first instance; the second instance does not have to start from initial conditions. Rather, the second instance can start from the state represented in a saved snapshot, or from a more advanced state. This advantage is achieved without requiring the application be halted as its state is saved to disk; in fact, the application need only be halted at times it seeks to modify sections of its memory not already saved to disk by a concurrent transfer-to-disk process. Furthermore, when it is so halted, it is only for as long as it takes to make a RAM copy of the section to be modified. Thus, the total delay suffered by the application can be much less than that required to create a copy of the memory used by the application in another area of RAM. These and other features and advantages of the invention are apparent from the description below with reference to the following figures.

DETAILED DESCRIPTION

In accordance with the present invention, a computer cluster AP1 comprises a first computer CP1, a second computer CP2, a disk array MD1, and a network NW1. Computer CP1 includes a data processor DP1, a transfer processor DT1 (which can be identical to data processor DP1 but assigned to a different task herein), volatile random-access memory RM1, a root hard-disk RD1, a disk interface DI1, and a network interface NI1. Likewise, computer CP2 includes a data processor DP2, a transfer processor DT2, random-access memory RM2, a root hard-disk RD2, a disk interface DI2, and a network interface NI2.

Disk interfaces DI1 and DI2 provide their respective host computers access to disk array MD1. Likewise, network interfaces NI1 and NI2 provide their respective host computers access to network NW1. Pursuant to the high-availability mission of computer cluster AP1, disk array RD1 is mirrored and network NW1 includes independent subnetworks.

A first instance AA1 of a supply control application is installed and configured to run on computer CP1; a first instance AB1 of an accounting application is also installed on computer CP1 but is configured not to run. A second instance AB2 of the accounting application is installed and configured to run on computer CP2. Also, a second instance AA2 of the supply control application is installed but not configured to run on computer CP2. In addition, cluster management daemons CD1 and CD2 are running respectively on computers CP1 and CP2.

Since supply control application AA1 can process data for days in RAM RM1 to achieve a desired solution, a failure impacting computer CP1 can delay processing for a like time. Accordingly, cluster manager CM1 issues a "fork" command to processor DP1 while it is executing supply control application AA1. In response, processor DP1 creates a snapshot of the current process state of application AA1. Initially, this involves copying the state of processor DP1 to RAM RM1 and creating pointers to the sections of RAM RM1 being used in executing application AA1. Transfer processor DT1 is then used to transfer the contents of the addresses pointed to disk system MD1. Transferred sections are flagged as "transferred".

While the snapshot is being transferred, processor DP1 continues execution of application AA1. When execution of application AA1 calls for modifying a section of memory included in the snapshot but that has not yet been transferred (as indicated by the transfer flag), the contents of the section are first copied to an unused section of RAM RM1, and the corresponding snapshot pointer is changed to point to the new location of the snapshot section. The original section can then be modified as required by application AA1 without affecting the integrity of the snapshot. If the application calls for modifying a section of memory that has already been transferred to disk, the section is not copied in RAM before being modifying.

Figure 1:
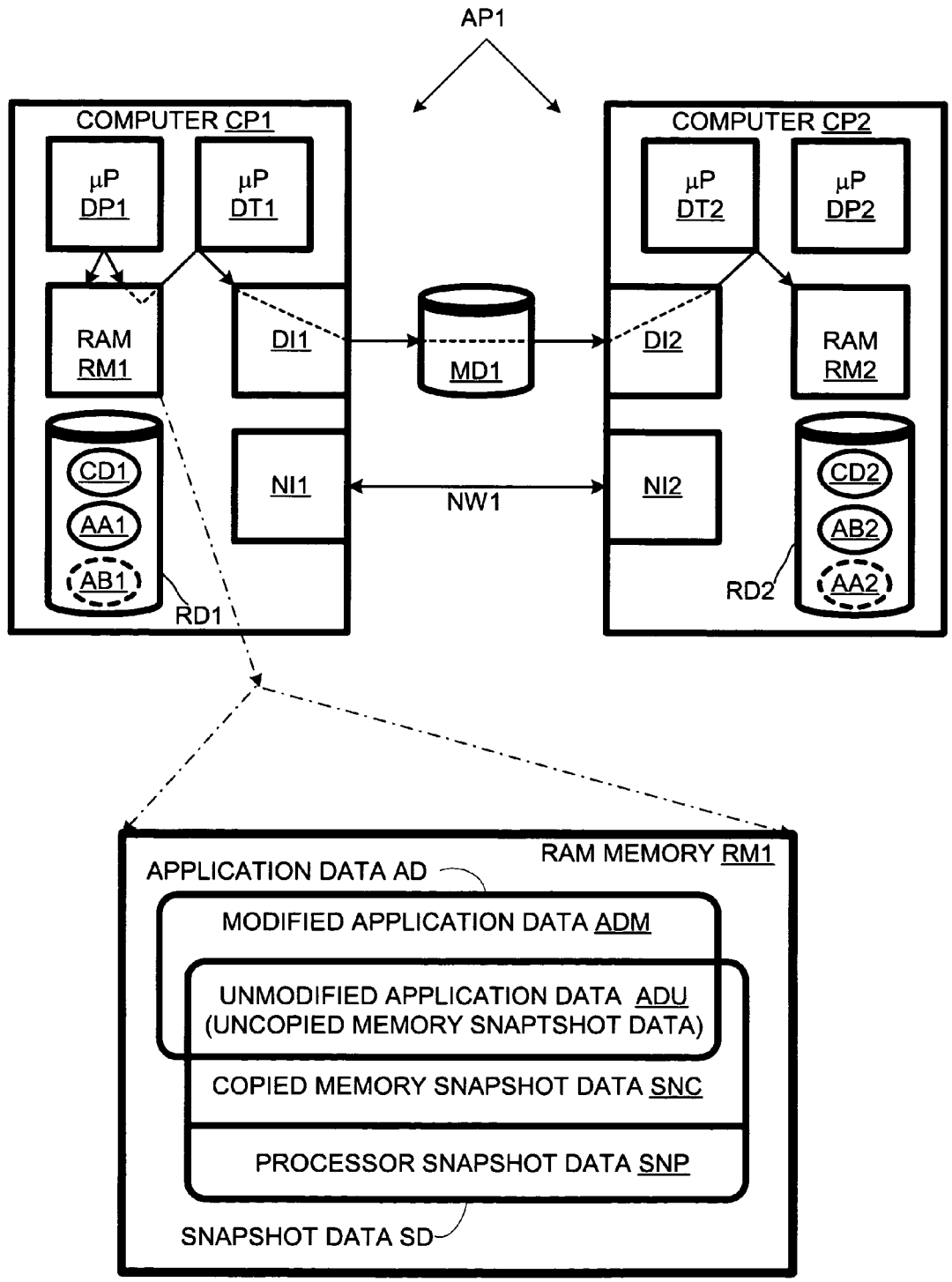
FIG. 1 is a schematic diagram of a high-availability computer cluster in accordance with the present invention.
Figure 2:
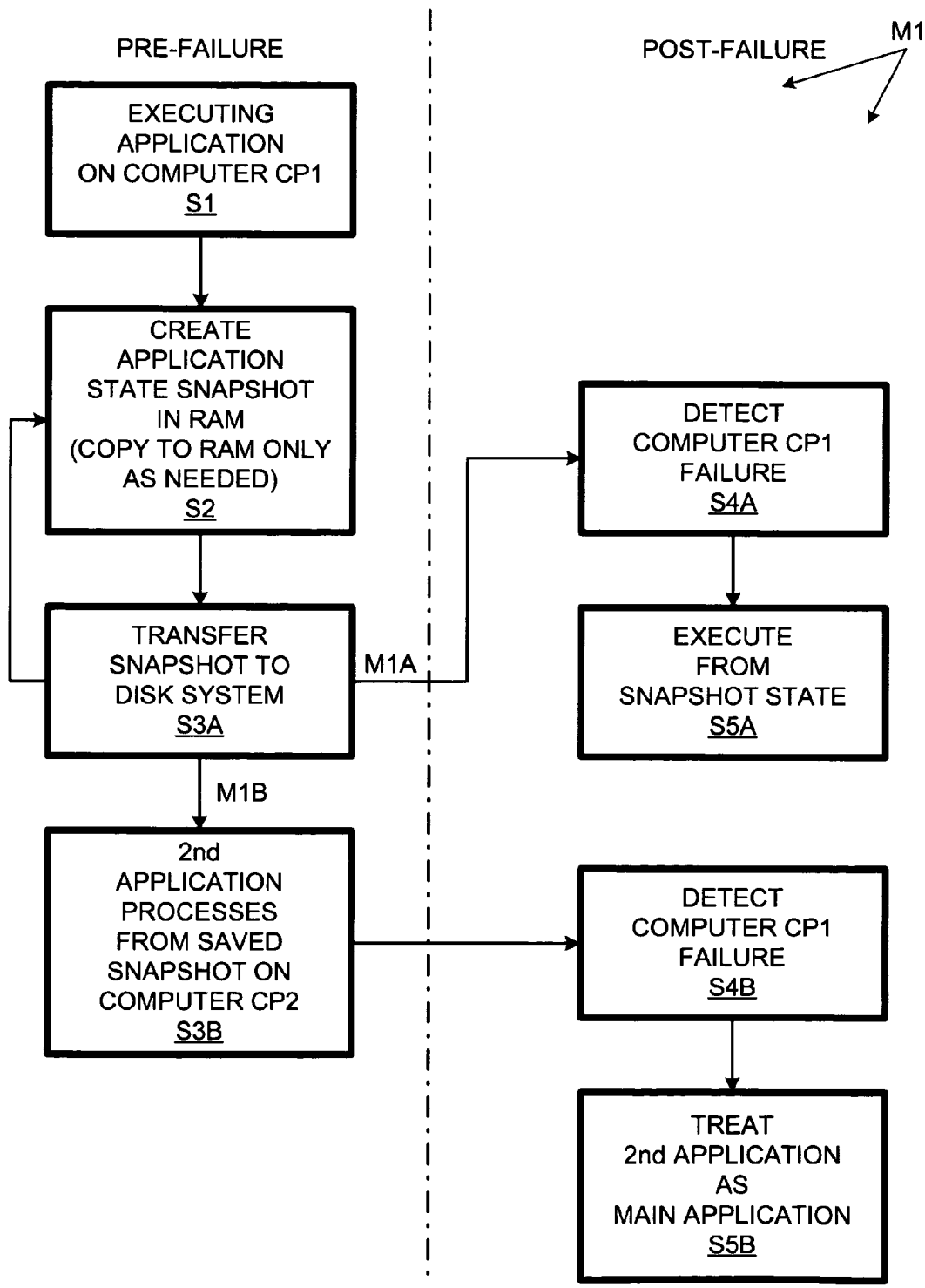
FIG. 2 is a flow chart of a method of the invention practiced in the context of the cluster of FIG. 1.

The resulting memory structure of RAM RM1 is shown in the detail of FIG. 1. RAM RM1 includes application data AD and snapshot data SD. At the instant the snapshot is first created, these two sets of data are coextensive except that the state data for processor DP1 is not part of application data AD. However, to the extent application AA1 calls for modifying sections of memory holding untransferred snapshot data, the two sets of data AD and SD diverge. The divergence defines distinct regions for unmodified application data ADU including uncopied snapshot data, modified application data ADM, copied memory snapshot data SNC, and processor snapshot data SNP. Snapshot data that has been transferred can be overwritten or discarded in RAM RM1.

A method M1 of the invention is flow-charted in FIG. 1. The broken vertical line separates pre-failure and post-failure steps. At pre-failure step S1, supply control application AA1 is launched and executed on computer CP1. While application AA1 is running, cluster daemon CD1 causes a snapshot to be created of a processor and memory state associated with the execution of application AA1. This can involve copying processor registers and the application-related contents of the RAM to an unused region of RAM RM1. Preferably, however, the copying of RAM RM1 contents is performed only when a section is to be modified, as described above. To minimize copying in RAM RM1, uncopied snapshot data (corresponding to unmodified sections of application data) can be given transfer priority over copied snapshot data (corresponding to modified sections of application data).

Once the snapshot is created, it is transferred to a shared disk system (or other nonvolatile memory accessible by computer CP2) at step S3A. Once transfer to the hard disk is completed, method M1 can return to step S2 and create a new snapshot, which is then transferred to disk. Preferably, the earlier snapshot would remain intact at least until writing of the later snapshot is complete; for example, successive snapshots can be written in alternation to two different file locations. Thus, a recent snapshot is always available on disk system MD1. Optionally, at step S3B, computer CP2 executes the second instance AA2 of the supply control application from the state represented in the snapshot even in the absence of a failure. Method M1 then has two variants M1A and M1B, depending on whether step S3B is implemented.

In variant M1A, upon detection at step S4A of a failure that prevents execution of the first instance AA1 of the supply-control application on computer CP1, the second instance AA2 of the application can be initialized using the most-recent snapshot state and then permitted to execute from that state at step S5A. In variant M1B, upon a comparable failure detection at step S4B, there is no need to initialize second instance AA2 as it is already executing and has progressed beyond the most-recent snapshot. Instead, at step S5B, second instance AA2 is treated as the main instance. For example, after the failure detection of step S4B, snapshots can be taken of the state of instance AA2, whereas before step S4B, this would not have been done.

Variant M1B provides for further reducing the maximum delay by beginning execution from a snapshot state as soon as it is available on hard disk system MD1 without the need for an intervening failure. Thus, if a failure occurs, the second instance AA2 will have advanced beyond the snapshot state and the lost time will be reduced correspondingly. However, as computer CP2 is also running accounting application AB2, the resources available to application AA2 are less than they were pre-failure for instance AA1. Hence, processing of instance AA2 can be slower than for instance AA1. Accordingly, there is still some advantage to providing updated snapshots from instance AA1. On the other hand, variant M1A can be preferred because it is less demanding on resources and can permit higher performance execution of application AB2.

In the preferred embodiment, the snapshot is transferred from RAM to a shared hard-disk system; alternatively, it can be transferred from RAM to a local hard disk of the first computer (or to shared disk storage) and then to a local disk of the adopting computer. Alternatively, the transfer can be from RAM directly to a local disk of the adopting computer.

Snapshot data in RAM RM1 can be discarded once it has been transferred to disk. This can involve discarding pointers to copied and uncopied snapshot data as the snapshot data is transferred or once transfer is complete. An intermediate solution is to retain snapshot data until transfer is complete except that transferred snapshot data is discarded to the extent it is overwritten by application data.

While the foregoing description involves a cluster running a supply-control application and an accounting application, the invention applies to a wide variety of applications. The invention provides the greatest advantage for RAM-intensive applications such as logistics, artificial intelligence (e.g., as applied to data analysis), and various scientific applications. While the invention provides the greatest advantage to RAM-intensive applications, it applies more generally to applications that do a lot of processing between saves to disk. Furthermore, the invention can provide a performance alternative to many applications that do save to disk often.

The invention provides a variety of approaches to handling successive snapshots. For example, each snapshot could overwrite its predecessor; however, this might leave the system without an intact snapshot in the event a failure occurs during overwriting. To ensure continuous availability of an intact snapshot, a succeeding snapshot is preferably written to a different location than its predecessor. The snapshots can be given different file names, or a succeeding snapshot can be written to a temporary file that assumes a single snapshot file name once writing is complete. Alternatively, a backup copy of an earlier snapshot can remain intact while a main copy is overwritten. Those skilled in the art are aware of many alternatives to ensuring an intact file is continuously maintained while more recent versions are stored. In this vein, the storage media used for storing snapshots can be a single hard disk, a multi-disk system, and/or a distributed set of disks or other storage media.

The invention provides alternative ways of configuring a two-computer cluster. For example, an application can run from an initial state on both computers, while snapshots are taken from one computer and stored in case of failure, while the other computer provides maximum performance by not creating snapshots. Alternatively, two instances of an application can run from an initial state, with snapshots being taken in alternation from the two computers.

The invention also applies to clusters of three and more computers, including clusters of clusters such as those used for disaster-tolerant applications. For example, an application can run on two nodes, each of which provides snapshots to a third backup node. Alternatively, one node can provide snapshots to in alternation to two disk arrays for access by different potential adoptive nodes. These and other variations upon and modifications to the detailed embodiment are provided for by the present invention, the scope of which is defined by the following claims.

What is claimed is:

1. A computer cluster comprising:
storage media;
a first computer having a first instance of an application program installed, said application program having instructions, said first computer including,
    volatile memory;
    processing means
        for executing instructions of said first instance of said application program so as to modify data stored in said volatile memory,
        for creating a snapshot of said data while said first instance of said application program is running, said snapshot being stored in said volatile memory, and
        for, while said first instance of said application continues to modify said data so that it diverges from said snapshot, transferring said snapshot from said volatile memory to said storage media, and
    a second computer having a second instance of said application program installed, said second computer including means for accessing said storage media so that said second instance of said application can access said snapshot as stored on said storage media.

2. A computer cluster as recited in claim 1 wherein said processing means includes
    a data processor
        for executing instructions of said first instance of said application program so as to modify data stored in said memory, and
        for creating said snapshot of said data while said first instance of said application program is running, said snapshot being stored in said volatile memory, and
    a transfer processor for transferring said snapshot from said volatile memory to said storage media while said first instance of said application program is running.

3. A computer cluster as recited in claim 1 further comprising a first cluster daemon running on said first computer for causing said snapshot to be created.

4. A computer cluster as recited in claim 1 further comprising a second cluster daemon running on said second computer, said second cluster daemon providing:
    for detecting a failure that prevents said first instance of said application program from running on said first computer, and
    for causing, in response to said detecting a failure, said second computer to process said snapshot in accordance with instructions of said second instance of said application program.

5. A computer cluster as recited in claim 1 wherein said processing means provides for, in response to a write access of a section of said volatile memory in accordance with instructions of said first instance of said application program, copying data in that section so that one instance of said data originally in that section is modified and the other copy of data originally in that section is not modified.

6. A computer cluster as recited in claim 2 wherein said data processing means maintains state data, said snapshot data including at least some of said state data.

7. A method comprising:
    executing a first instance of an application program on a first computer of a computer cluster so as to generate a series of memory states;
    creating a snapshot of one of said states; and
    at least partially during a state that differs from the state represented in said snapshot, transferring said snapshot to storage media accessible by a second computer of said computer cluster.

8. A method as recited in claim 7 further comprising executing a second instance of said application program on a second computer of said computer cluster using said snapshot as a starting state.

9. A method as recited in claim 8 further comprising detecting a failure that prevents execution of said first instance of said application program, said detecting occurring after said transferring and before said executing a second instance.

10. A method as recited in claim 8 wherein said executing a second instance follows said transferring without an intervening detection of a failure.

11. A method as recited in claim 7 wherein said transferring is effected by a data transfer processor not used in executing said first instance of said application.

12. A method as recited in claim 7 wherein said executing is effected by a data processor that stores processor state data internally, said snapshot including said processor state data.

* * * * *